United States Patent Office 3,272,700
Patented Sept. 13, 1966

3,272,700
STABILIZED AQUEOUS SOLUTION OF TETRACAINE SALT
Irwin S. Shupe, North Greenbush, N.Y., assignor to Sterling Drug Inc., New York, N.Y., a corporation of Delaware
No Drawing. Filed Oct. 3, 1963, Ser. No. 313,422
1 Claim. (Cl. 167—52)

This application is a continuation-in-part of my copending application Serial No. 167,955, filed January 22, 1962, now abandoned.

This invention relates to an improved aqueous solution of an acid-addition salt of 2-dimethylaminoethyl 4-n-butylaminobenzoate and to a method of maintaining clarity in said solution.

2-dimethylaminoethyl 4-n-butylaminobenzoate, also known generically as tetracaine, is a well-known commercial local anesthetic. It has been sold for almost twenty-five years in the form of its hydrochloride in aqueous solution in various concentrations adapted for prolonged spinal anesthesia, for surface anesthesia for dental practice, etc.

Manufacturers of such solutions, while enjoying commercial success over the years with these readily acceptable and efficacious aqueous preparations have been at the same time faced with the persistent problem of how to increase the storage life of the solutions. On standing, these tetracaine solutions have the disadvantage of yielding small quantties of precipitated 4-n-butylaminobenzoic acid, a hydrolysis degradation product of tetracaine. The 4-n-butylaminobenzoic acid, which is relatively insoluble in aqueous solutions, separates as crystals or produces cloudiness in the solution.

I have now found that the precipitation of 4-n-butylaminobenzoic acid from solutions of tetracaine salts, for instance the hydrochloride, is prevented by incorporating in the solutions a small quantity of an oxyethylated alkylphenol-formaldehyde polymer. The resulting solutions, the composition aspect of my invention, have increased shelf life when stored for long periods at room temperature (25° C.) and even at temperatures of 37°, 40° and 50° C. or when heated as high as 121° C. for periods of one to three hours.

The oxyethylated alkylphenol-formaldehyde polymers useful in the compositions of the invention are prepared by condensing a mole of an alkylphenol with 0.5–1.0 mole of formaldehyde and reacting the product thus obtained with 8–60 moles of ethylene oxide, as described in U.S. Patent 2,454,541. Particularly useful polymers are the oxyethylated p-tertiary-octylphenol-formaldehyde polymers produced by condensing approximately equimolar amounts of p-tertiary-octylphenol and formaldehyde and then reacting the product with 10–20 moles of ethylene oxide. A preferred compound of this group is the product containing ten ether groups per p-tertiary-octylphenol nucleus which is known under the brand names, "Superinone" and "Triton WR–1339," chemically as oxyethylated tertiary octylphenol formaldehyde polymer or p-isooctylpolyoxyethylenephenol formaldehyde polymer, and, generically as tyloxapol [J. Am. Med. Assoc., 181, 243 (1962)]; the preparation of a closely similar and equivalently useful compound is described in Example 1 of U.S. Patent 2,454,541, wherein eleven moles of ethylene oxide are used.

Aqueous solutions of the invention preferably have about 0.4 to about 1 percent (weight per volume) of an oxyethylated alkylphenol - formaldehyde polymer. Greater quantities of the polymer, up to about 10 percent or more, can be used but to no particular advantage. Preferred embodiments are aqueous solutions containing about 0.1 to 2 percent of 2-dimethylaminoethyl 4-n-butylaminobenzoate hydrochloride and about 0.4 to 1 percent of tyloxapol. A particularly preferred embodiment contains 1.0 percent of tetracaine hydrochloride and 0.8 percent of tyloxapol.

Another aspect of my invention resides in a method for maintaining clarity in an aqueous solution of a pharmaceutically-acceptable salt of 2-dimethylaminoethyl 4-n-butylaminobenzoate which comprises incorporating in said solution normally subject to precipitation or cloudiness on storage an oxyethylated alkylphenol-formaldehyde polymer in amount sufficient to keep the hydrolysis degradation product 4-n-butylaminobenzoic acid in solution on storage. Preferred essential ingredients of said solution and preferred percentages thereof are presented hereinabove.

My invention is further illustrated by the following specific embodiments without, however, limiting it thereto. U.S.P. grade ingredients are used in the following examples.

Example 1

The following aqueous solutions containing 1 percent (weight per volume, i.e., 1 g. per 100 ml.) tetracaine hydrochloride containing 0, 0.1, 1.0 and 10 percent tyloxapol were prepared:

| Ingredient | 1A | 1B | 1C | 1D |
|---|---|---|---|---|
| Tetracaine hydrochloride | 1.0 | 1.0 | 1.0 | 1.0 |
| Sodium chloride | 0.67 | 0.67 | 0.67 | 0.67 |
| Acetone sodium bisulfite | 0.20 | 0.20 | 0.20 | 0.20 |
| Tyloxapol | | 0.1 | 1.0 | 10.0 |

The solutions were prepared by dissolving the ingredients in distilled water and then were poured into 2 ml. flint ampuls, sterilized by heating at 220° F. for three minutes and stored at 122° F. (50° C.).

The solutions were assayed for free 4-n-butylaminobenzoic acid (BABA) initially and after one and eight months storage at 50° C. with the following results:

| Preparation | BABA, mg./ml. | | | pH | |
|---|---|---|---|---|---|
| | Initial | 1 month at 50° C. | 8 months at 50° C. | Initial | Final |
| 1A | 0.015 | 0.103 | 0.129 | 3.5 | 3.5, 3.1 |
| 1B | 0.018 | 0.119 | 0.139 | 3.4 | 3.15 |
| 1C | 0.015 | 0.150 | 0.378 | 3.5 | 3.08 |
| 1D | 0.019 | 0.105 | 0.429 | 3.4 | 2.61 |

None of the ampuls stored for 8 months at 50° C. showed any sign of crystallization after being allowed to cool and to stand at room temperature overnight. However, on refrigerating at 5° C., some amorphous precipitate separated in the control (1A) and in the 0.1% tyloxapol solution (1B). No precipitate formed, even after a full week in the refrigerator, in the solutions containing 1% (1C) or 10% (1D) tyloxapol.

It is seen from the above results that 0.1% tyloxapol did not prevent the precipitation of BABA in the solution containing 0.14 mg. of BABA per ml. and that 1.0% tyloxapol did prevent the precipitation of as much as 0.38 mg. of BABA per ml., the latter representing 3.8% decomposition of the tetracaine hydrochloride. It is also seen that 10.0% tyloxapol prevented the precipitation of 0.43 mg. of BABA per ml., which represents only 4.3% decomposition of tetracaine hydrochloride.

Example 2

The following solutions of 1 percent tetracaine hydrochloride containing 0, 0.2, 0.4, 0.6 and 0.8 percent tyloxapol were prepared:

| Ingredient | 2A | 2B | 2C | 2D | 2E |
|---|---|---|---|---|---|
| Tetracaine hydrochloride, g | 5.0 | 5.0 | 5.0 | 5.0 | 5.0 |
| Sodium chloride, g | 3.35 | 3.35 | 3.35 | 3.35 | 3.35 |
| Acetone sodium bisulfite, g | 1.0 | 1.0 | 1.0 | 1.0 | 1.0 |
| Tyloxapol, g | | 1.0 | 2.0 | 3.0 | 4.0 |
| Water for injection, ml., q.s. ad | 500 | 500 | 500 | 500 | 500 |

Each of the above solutions was prepared as follows: The acetone sodium bisulfite was dissolved in about 400 ml. of distilled water containing the tyloxapol. The sodium chloride and tetracaine hydrochloride were then dissolved, respectively; and the pH of the solution was checked and adjusted to 4.6. Distilled water was added to give 500 ml. of solution which was filtered through an ultra fine frit glass filter into a sterile system and then filled into 2 ml. flint ampuls under aseptic conditions. The ampuls were heated at 220° F. for three minutes, submitted for chemical assay and some were then stored at 40° C., some in a refrigerator (about 5° C.) and some at room temperature (about 20-25° C.).

The results of the initial assay are summarized as follows:

| Ingredient | 2A | 2B | 2C | 2D | 2E |
|---|---|---|---|---|---|
| Tetracaine HCl, mg./ml | 9.5 | 9.7 | 9.7 | 9.7 | 9.6 |
| Tyloxapol, mg./ml | | 2.35 | 4.6 | 5.50 | 7.30 |
| BABA, mg./ml | 0.022 | 0.024 | 0.025 | 0.024 | 0.025 |
| pH | 3.35 | 3.00 | 2.95 | 2.90 | 2.90 |

The solution stored at 40° C. were assayed for BABA after three and six months with the following results:

| Solution | 3 mo. at 40° C. | | 6 mo. at 40° C. | |
|---|---|---|---|---|
| | BABA, mg./ml. | pH | BABA, mg./ml. | pH |
| 2A | 0.098 | 3.05 | 0.103 | 3.05 |
| 2B | 0.159 | 2.95 | 0.202 | 2.95 |
| 2C | 0.167 | 3.00 | 0.253 | 2.95 |
| 2D | 0.171 | 3.00 | 0.283 | 2.90 |
| 2E | 0.171 | 3.05 | 0.292 | 2.88 |

After storage for six months at 40° C., solutions 2C, 2D and 2E remained clear and solutions 2A and 2B yielded crystals when chilled for six hours in an ice bath. Thus, it is seen that 0.2% tyloxapol did not prevent the precipitation of BABA in the solution containing 0.20 mg. of BABA per ml. and 0.4%, 0.6% and 0.8% tyloxapol did prevent the precipitation of as much as 0.25 mg., 0.28 mg. and 0.29 mg., respectively, of BABA per ml.

Example 3

The following solutions of 1 percent tetracaine hydrochloride containing 0, 0.2, 0.4, 0.6 and 0.8 percent tyloxapol were prepared as in Example 2 but adding a lactic acid-sodium lactate buffer:

| Ingredient | 3A | 3B | 3C | 3D | 3E |
|---|---|---|---|---|---|
| Tetracaine HCl, g | 2.5 | 2.5 | 2.5 | 2.5 | 2.5 |
| Sodium chloride, g | 0.925 | 0.925 | 0.925 | 0.925 | 0.925 |
| Acetone sodium bisulfite, g | 0.5 | 0.5 | 0.5 | 0.5 | 0.5 |
| Tyloxapol, g | | 0.5 | 1.0 | 1.5 | 2.0 |
| Sodium lactate (60%), ml | 1.5 | 1.5 | 1.5 | 1.5 | 1.5 |
| Lactic acid (85%), ml | 0.075 | 0.075 | 0.075 | 0.075 | 0.075 |
| Water for injection, q.s. ad, ml | 250 | 250 | 250 | 250 | 250 |
| Adjusted pH | 3.98 | 4.05 | 4.03 | 4.05 | 4.03 |

The pH was adjusted to the above values using lactic acid. The solutions were filled into sterile 2 ml. flint ampuls, heated at 220° F. for three minutes and stored at 40° C. after submitting some of the ampuls for initial chemical assay.

The results of the initial assay follow:

| Ingredient | 3A | 3B | 3C | 3D | 3E |
|---|---|---|---|---|---|
| Tetracaine HCl, mg./ml | 9.69 | 9.69 | 9.57 | 9.67 | 9.73 |
| Tyloxapol, mg./ml | | 2.33 | 4.40 | 6.40 | 8.50 |
| BABA, mg./ml | 0.034 | 0.033 | 0.033 | 0.027 | 0.027 |
| pH | 3.9 | 3.9 | 3.85 | 3.76 | 3.70 |

The solutions stored at 40° C. were assayed for BABA after three and six months with the following results:

| Solution | 3 mo. at 40° C. | | 6 mo. at 40° C. | | 12 mo. at 40° C. | |
|---|---|---|---|---|---|---|
| | BABA, mg./ml. | pH | BABA, mg./ml. | pH | BABA, mg./ml. | pH |
| 3A | 0.11 | 3.80 | 0.10 | 3.75 | 0.09 | 3.68 |
| 3B | 0.11 | 3.80 | 0.19 | 3.80 | 0.21 | 3.69 |
| 3C | 0.11 | 3.80 | 0.19 | 3.80 | 0.31 | 3.81 |
| 3D | 0.11 | 3.75 | 0.20 | 3.70 | 0.32 | 3.60 |
| 3E | 0.11 | 3.70 | 0.30 | 3.65 | 0.34 | 3.58 |

After storage for six months at 40° C., solutions 3B, 3C, 3D and 3E remained clear and solution 3A yielded crystals when chilled for two hours in an ice bath. After storage for twelve months at 40 C., solutions 3C, 3D and 3E remained clear and solutions 3A and 3B yielded crystals when chilled for five hours in an ice bath.

Example 4

The following solution containing 0.15 percent tetracaine hydrochloride and 0.8 percent of tyloxapol was prepared:

Ingredient:     Mg./ml.
- Tetracaine HCl _____ 1.5
- Sodium chloride _____ 8.6
- Calcium chloride·$2H_2O$ _____ 0.33
- Potassium chloride _____ 0.30
- Tyloxapol _____ 8.0

The anesthetic and the three inorganic chlorides were dissolved in most of the distilled water, the tyloxapol added and dissolved, the pH adjusted to 5.2 by addition of 0.1 N sodium hydroxide solution, and the remaining water added. The solution was filtered through an ultra fine frit glass filter into a sterile system and then filled into 100 ml. glass stoppered flint vials. The vials were heated at 220° F. for thirty minutes and stored at 37° C. for twelve months. Assays initially and after six and twelve months are summarized as follows:

| Ingredient | Initial, mg./ml. | 6 mo./37° C., mg./ml. | 12 mo./37° C., mg./ml. |
|---|---|---|---|
| Tetracaine | 1.48 | 1.46 | 1.32 |
| Tyloxapol | 8.0 | 7.6 | 6.6 |
| BABA | 0.015 | 0.034 | 0.056 |
| pH | 5.5 | 4.2 | 4.45 |

The solution after twelve months at 37° C. was clear and colorless.

Example 5

Following the procedure described in Example 2, the following solution containing 1.0 percent tetracaine hydrochloride and 0.80 percent of tyloxapol was prepared:

Ingredient:     Quantity
- Tetracaine HCl _____ g__ 50.00
- Tyloxapol _____ g__ 40.00
- Sodium chloride _____ g__ 33.50
- Acetone sodium bisulfite _____ g__ 10.00
- Water for injection, q.s. ad _____ ml__ 5000

Results of the initial assay and assays after storage at 37° C. for twelve months and at room temperature (25° C.) for twenty-three months are given as follows:

| Ingredient | Initial | 12 mo., 37° C. | 23 mo., 25° C. |
|---|---|---|---|
| Tetracaine HCl, mg./ml | 9.64 | 9.22 | 9.38 |
| Tyloxapol, mg./ml | 7.94 | 8.4 | 8.42 |
| BABA, mg./ml | | 0.31 | 0.23 |
| pH | 3.70 | 3.50 | 3.68 |

The two stored solutions were clear and colorless after the storage periods. Also, the same solution was stored for thirty-four months at 25° C., was next heated at 250° F. for twenty minutes, and, on assay, was found to contain only 0.26 mg./ml. of BABA and to have a pH of 3.70.

As noted below, this embodiment gave good results when tested clinically.

*Example 6*

For comparative heat stability studies, the following solutions of 1 percent tetracaine hydrochloride containing 0 and 0.8 percent tyloxapol were prepared, the former solution (6A) being a presently commercial preparation and the latter (6B) being a preferred embodiment of my invention.

| Ingredient | 6A | 6B |
|---|---|---|
| Tetracine HCl, g | 1.00 | 1.00 |
| Tyloxapol, g | | 0.80 |
| Sodium chloride, g | 0.67 | 0.67 |
| Acetone sodium bisulfite, g | 0.20 | 0.20 |
| Water for injection, ml., q.s. ad | 100.00 | 100.00 |

These solutions were prepared following the procedure described in Example 2 and in addition to heating some of the ampulled solution at 220° F. for three minutes, as in Example 2, some of the solution was assayed with no heating and some assayed after heating for different times indicated below. My solution with tyloxapol assayed as follows:

| Solution 6B | Not Heated | 220° F., 3 min. | 121° C., 15 min. | 121° C., 30 min. | 121° C., 45 min. | 121° C., 60 min. |
|---|---|---|---|---|---|---|
| Tetracaine HCl, mg./ml | 9.9 | 9.8 | 9.8 | 9.7 | 9.8 | 9.7 |
| Tyloxapol, mg./ml | 8.2 | 8.2 | 8.2 | 8.2 | 8.2 | 8.2 |
| BABA, mg./ml | 0.012 | 0.014 | 0.029 | 0.042 | 0.053 | 0.069 |
| pH | 3.35 | 3.15 | 3.15 | 3.15 | 3.15 | 3.15 |

The commercial preparation with no tyloxapol assayed as follows:

| Solution 6A | Not Heated | 220° F., 3 min. | 121° C., 15 min. | 121° C., 30 min. | 121° C., 45 min. | 121° C., 60 min. |
|---|---|---|---|---|---|---|
| Tetracaine HCl, mg./ml | 9.7 | 9.8 | 9.9 | 9.8 | 9.7 | a 9.7 |
| BABA | 0.010 | 0.013 | 0.032 | 0.044 | 0.059 | 0.072 |
| pH | 3.40 | 3.70 | 3.70 | 3.60 | 3.60 | 3.50 | a Crystal formation when chilled in refrigerator (about 4° C.).

From the above results, it is noted that the presence of tyloxapol did not induce the hydrolysis of the tetracaine, the BABA concentrations being about the same for the two solutions when treated the same. However, the preparation with no tyloxapol (6A) showed crystal formation when heated at 121° C. for sixty minutes and then stored in a refrigerator (about 4° C.) for a few days. In contrast, my solution (6B) even when heated at 121° C. for as long as three hours and then stored in a refrigerator for a few days showed no crystal formation.

The aqueous solutions of my invention were tested by standard procedures and the presence of the tyloxapol in the solutions was found not to have any significant change on the local anesthetic activity, toxicity, or irritancy when compared with corresponding solutions without the tyloxapol. For example, the average duration of urethral anesthesia in rabbits was 137±9.0 minutes for 1.0 percent tetracaine hydrochloride alone and 161±19.3 minutes for 1.0 percent tetracaine hydrochloride with 1.0 percent tyloxapol; these data show that the addition of tyloxapol had slight if any effect on duration of anesthesia by tetracaine hydrochloride alone. Similarly, no significant change in local anesthetic activity occurred when 1 percent tyloxapol was added to a 0.25 or 0.50 percent tetracaine hydrochloride solution when tested by the intradermal wheal test in guinea pigs.

The acute oral toxicity in mice of tetracaine hydrochloride plus a 2 percent aqueous solution of tyloxapol was not significantly different from that of tetracaine hydrochloride in distilled water without tyloxapol. When a 25 percent aqueous solution of tyloxapol alone was studied for toxic effects in mice, no deaths occurred with oral doses as high as 10,000 mg./kg., i.e., $LD_{50}$ >10,000 mg./kg.

The acute intravenous $LD_{50}$ determinations in mice carried out with 1.0 percent tetracaine hydrochloride alone, with 1.0 percent tetracaine hydrochloride containing 1.0 percent tyloxapol, and with 0.25 percent tetracaine hydrochloride containing 1.0 percent tyloxapol were respectively: 6.7±0.7, 6.3±0.6 and 6.2±0.6 mg./kg. in terms of tetracaine hydrochloride. Thus, the addition of tyloxapol to tetracaine hydrochloride, in the concentrations studied, had no significant effect on the acute intravenous $LD_{50}$ for tetracaine hydrochloride in mice. When a 25 percent concentration of tyloxapol alone was studied intravenously for toxic effects in mice, the $LD_{50}$ was >10,000 mg./kg.

The solution embodiment of my invention described above in Example 5 (also as Examples 2E and 6B) has been studied clinically by leading anesthetists accustomed to doing spinal anesthesias. These investigators tested the solution in 420 patients ranging in age from 13 to 89 and found it to be safe and effective for its intended purpose. They obtained good results with 384 patients, fair results with 31 patients, and poor results with only 5 patients; side effects were mild and were observed in only a small number of patients, e.g., mild hypotension (7), nausea (4), vomiting (11) and headache (1).

Other aqueous local anesthetic solutions can be prepared in accordance with the foregoing description by using, in addition to the essential ingredients of tetracaine hydrochloride and oxyethylated alkylphenol-formaldehyde polymer, other anesthetics, preservatives, buffering agents, etc., provided they are mutually compatible with the essential ingredients of the solution.

I claim:

A stabilized aqueous solution of a pharmaceutically-acceptable acid-addition salt of 2-dimethylaminoethyl 4-n-butylaminobenzoate having as the stabilizing agent between about 0.4 to about 1.0 percent tyloxapol per 0.1 to 2 percent of said benzoate.

References Cited by the Examiner

UNITED STATES PATENTS

| | | | |
|---|---|---|---|
| 2,637,679 | 5/1953 | Gaunt | 167—58 |
| 2,649,918 | 8/1953 | Miller | 167—58 |
| 2,880,138 | 3/1959 | Johnson | 167—65 |

OTHER REFERENCES

Clark, Chem. Abst., volume 48, pages 10937–10938, 1954.

Drill, Pharmacology in Medicine, sec. ed., McGraw-Hill, 1958, page 106.

Monash, Arch. Dermatol., vol. 76, No. 6, pages 752–756, December 1957.

Sisley, Encyclopedia of Surface-Active Agents, Chem. Pub. Co., 1952, pages 538–539.

JULIAN S. LEVITT, *Primary Examiner.*

FRANK CACCIAPAGLIA, JR., *Examiner.*

UNITED STATES PATENT OFFICE
CERTIFICATE OF CORRECTION

Patent No. 3,272,700 September 13, 1966

Irwin S. Shupe

It is hereby certified that error appears in the above numbered patent requiring correction and that the said Letters Patent should read as corrected below.

Column 1, line 30, for "quantties" read -- quantities --; column 3, line 69, fourth Table, third column, line 6, for "0.975" read -- 0.075 --; columns 5 and 6, fourth Table, seventh column, line 1, for "$^a 9.7$" read -- 9.7 --; same column line 2, for "0.072" read -- $^a 0.072$ --.

Signed and sealed this 5th day of September 1967.

(SEAL)
Attest:

ERNEST W. SWIDER
Attesting Officer

EDWARD J. BRENNER
Commissioner of Patents